US012659611B2

(12) United States Patent
Tang et al.

(10) Patent No.: US 12,659,611 B2
(45) Date of Patent: Jun. 16, 2026

(54) DYNAMIC VISION SENSOR SYSTEM WITH MULTI-CHANNEL DIFFERENTIAL AMPLIFICATION AND EVENT DETECTION

(71) Applicant: Himax Imaging Limited, Tainan City (TW)

(72) Inventors: Ya-Wen Tang, Tainan City (TW); Dong-Long Lin, Tainan City (TW)

(73) Assignee: Himax Imaging Limited, Tainan City (TW)

( * ) Notice: Subject to any disclaimer, the term of this patent is extended or adjusted under 35 U.S.C. 154(b) by 51 days.

(21) Appl. No.: 18/932,430

(22) Filed: Oct. 30, 2024

(65) Prior Publication Data

US 2026/0122365 A1 Apr. 30, 2026

(51) Int. Cl.
| | |
|---|---|
| *H04N 5/335* | (2011.01) |
| *H04N 25/47* | (2023.01) |
| *H04N 25/76* | (2023.01) |
| *H04N 25/78* | (2023.01) |

(52) U.S. Cl.
CPC ......... *H04N 25/47* (2023.01); *H04N 25/7795* (2023.01); *H04N 25/78* (2023.01)

(58) Field of Classification Search
CPC ...................................................... H04N 25/47
See application file for complete search history.

(56) References Cited

U.S. PATENT DOCUMENTS

| | | | |
|---|---|---|---|
| 11,650,239 B2 * | 5/2023 | Oms | H02H 3/17 |
| | | | 361/91.1 |
| 12,477,239 B2 * | 11/2025 | Mikkola | H04N 25/47 |

* cited by examiner

*Primary Examiner* — Gary C Vieaux
(74) *Attorney, Agent, or Firm* — Donald E. Stout; Stout, Uxa & Buyan, LLP

(57) ABSTRACT

A dynamic vision sensor (DVS) system includes a pixel array composed of a plurality of pixels; a multi-channel differential amplifier composed of a plurality of differential amplifiers coupled to respectively receive plural pairs of pixel signals from one or more frames read out of the pixel array, thereby generating a plurality of difference signals respectively; a multi-channel comparator composed of a plurality of comparators configured to respectively compare the difference signals with a predetermined threshold, thereby generating a plurality of flags respectively; and an event detection circuit that generates an event signal according to the flags.

13 Claims, 3 Drawing Sheets

FIG. 2

DYNAMIC VISION SENSOR SYSTEM WITH MULTI-CHANNEL DIFFERENTIAL AMPLIFICATION AND EVENT DETECTION

BACKGROUND OF THE INVENTION

1. Field of the Invention

The present invention generally relates to an image sensor, and more particularly to a dynamic vision sensor (DVS).

2. Description of Related Art

A dynamic vision sensor (DVS) is an event-based imaging sensor that responds to local changes in brightness and captures changes in the scene asynchronously. This is different from conventional image sensors, which capture images at fixed intervals.

Compared with conventional image sensors or non-event-based image sensors, DVS sensors have the following advantages: low latency, as DVS sensors only respond to changes, making them suitable for high-speed applications; high dynamic range, because DVS sensors can operate effectively in a wide range of lighting conditions, from very bright to very dark environments; and reduced data and power consumption, due to capturing only changes, significantly reducing the amount of data that needs to be processed, which is beneficial for real-time applications.

DVS sensors may be used in various fields such as robotics for navigation and obstacle avoidance, industrial automation for monitoring and controlling fast-moving processes, consumer electronics requiring fast and efficient visual processing, and autonomous vehicles for detecting and reacting to dynamic environments.

For conventional DVS sensors, pixels independently respond to changes in brightness as they occur. Each pixel stores a reference brightness level, and continuously compares it to the current brightness level. If the difference in brightness exceeds a (local) threshold, that pixel resets its reference level and generates an event: a discrete packet that contains the pixel address and timestamp. Events may also contain the polarity (increase or decrease) of a brightness change, or an instantaneous measurement of the illumination level. Thus, DVS sensors output an asynchronous stream of events triggered by changes in scene illumination. As a result, conventional DVS sensors easily suffer from inconsistency in the overall sensitivity of the sensor and are easily affected by noise.

For the foregoing reasons, a need has thus arisen to propose a novel scheme to overcome the drawbacks of the conventional DVS sensors.

SUMMARY OF THE INVENTION

In view of the foregoing, it is an object of the embodiment of the present invention to provide a dynamic vision sensor (DVS) system with uniform sensitivity across the entire sensor and reduced noise adaptable to detecting spatial difference for edge detection or enhancement or detecting time difference for motion detection.

According to one embodiment, a dynamic vision sensor (DVS) system includes a pixel array, a multi-channel differential amplifier, a multi-channel comparator and an event detection circuit. The pixel array is composed of a plurality of pixels. The multi-channel differential amplifier is composed of a plurality of differential amplifiers coupled to respectively receive plural pairs of pixel signals from one or more frames read out of the pixel array, thereby generating a plurality of difference signals respectively. The multi-channel comparator is composed of a plurality of comparators configured to respectively compare the difference signals with a predetermined threshold, thereby generating a plurality of flags respectively. The event detection circuit generates an event signal according to the flags.

BRIEF DESCRIPTION OF THE DRAWINGS

FIG. 2 shows a detailed block diagram of the DVS system of FIG. 1 for mode 1 according to one specific embodiment of the present invention.

DETAILED DESCRIPTION OF THE INVENTION

Figure 1:
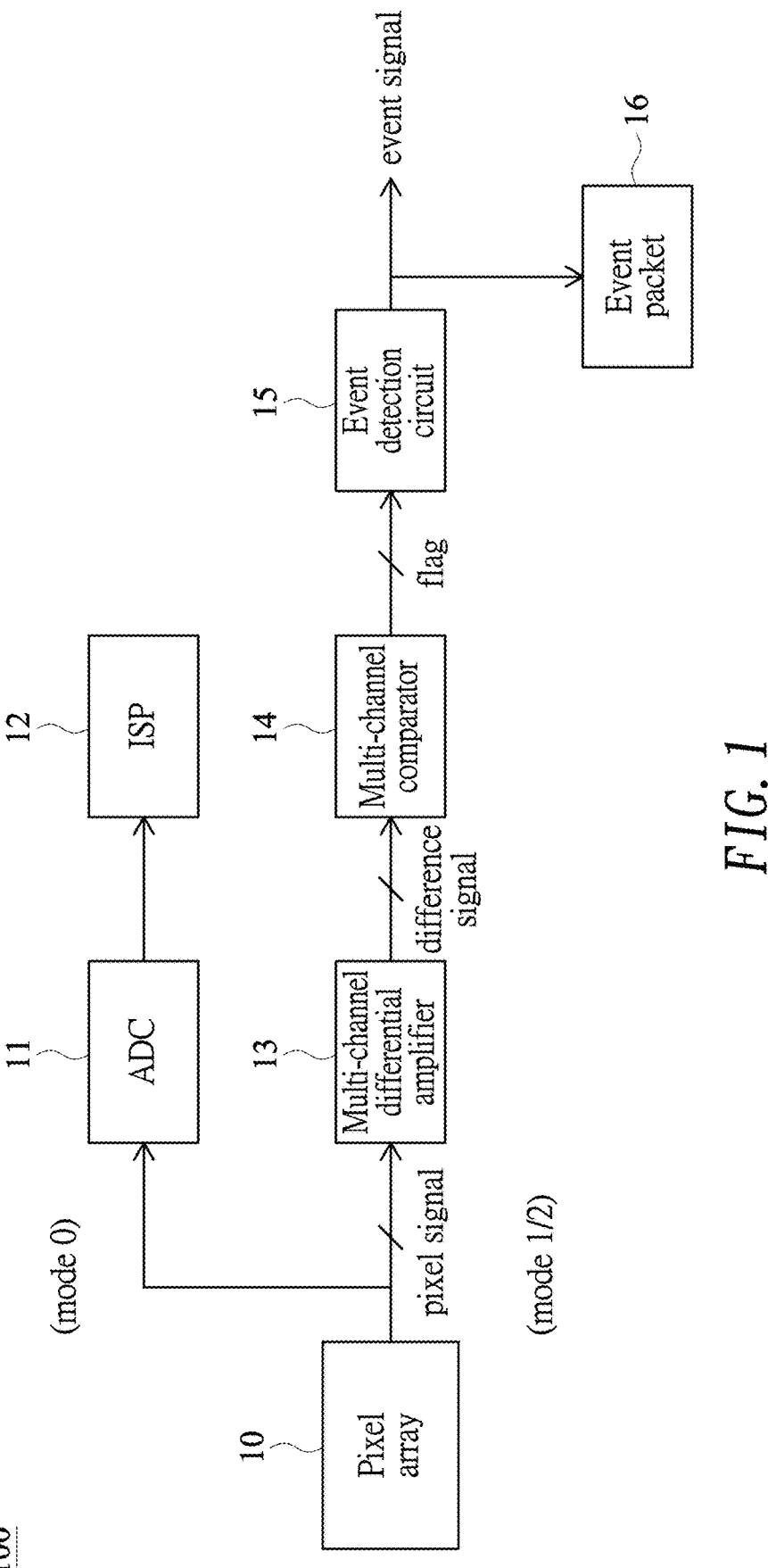
FIG. 1 shows a block diagram illustrating a dynamic vision sensor (DVS) system according to one embodiment of the present invention.

FIG. 1 shows a block diagram illustrating a dynamic vision sensor (DVS) system 100 according to one embodiment of the present invention. The DVS system 100 may be adapted to, but not limited to, detecting spatial difference or time difference. The DVS system 100 of the embodiment may have multiple switchable modes.

For mode 0 (or normal mode), the DVS system 100 may include an analog-to-digital converter (ADC) 11 configured to convert analog signals of a frame (of image) read out of a pixel array 10 composed of a plurality of pixels (of an image sensor) into digital signals. The DVS system 100 may include an image signal processor (ISP) 12 configured to process the digital signals (from the ADC 11). Common operations performed by the ISP 12 may include, but not limited to, demosaicing for converting raw data from the pixel array 10 into a full-color image by interpolating the missing color information for each pixel; noise reduction for reducing random noise that can degrade image quality, especially in low-light conditions; auto exposure and auto white balance for adjusting the exposure and white balance settings to ensure the image has the correct brightness and color balance; high dynamic range (HDR) processing for combining multiple exposures to create a single image with a higher dynamic range, capturing more detail in both shadows and highlights; image sharpening for enhancing the edges and fine details in the image to make it appear clearer and more defined; and color correction for adjusting the colors in the image to ensure they are accurate and visually pleasing.

For mode 1 (also called edge detection mode) or mode 2 (also called motion detection mode), the DVS system 100 of the embodiment may include a multi-channel differential amplifier (or differential amplifier array) 13 composed of a plurality of differential amplifiers coupled to respectively receive plural pairs of pixel signals from (a specific partial or non-entire region in) one or more frames read out of the pixel array 10, according to which a plurality of difference signals are generated respectively. Accordingly, pixel signals of each pair may be readout from a same frame, or be readout from different frames, for example, from two consecutive frames.

In the embodiment, the DVS system 100 may include a multi-channel comparator (or comparator array) 14 composed of a plurality of comparators configured to respectively compare the difference signals with a predetermined threshold, thereby generating a plurality of flags respectively. The flags are asserted (or active) when corresponding difference signals are greater than the predetermined threshold. The predetermined threshold may, but not necessarily, be a global threshold.

The DVS system 100 may include an event detection circuit 15 configured to generate an event signal according to the flags. In one embodiment, the event signal is asserted (or active) when at least one of the flags is asserted. Events associated with corresponding event signals may be collected in or grouped into an event packet (or data packet) 16. The events as stored in the event packet 16 may contain the following information: timestamp recording precise time at which the event occurred, pixel coordinates (or pixel address) of the pixels where the event is detected, and polarity indicating whether change in light intensity is an increase or a decrease.

Figure 2:
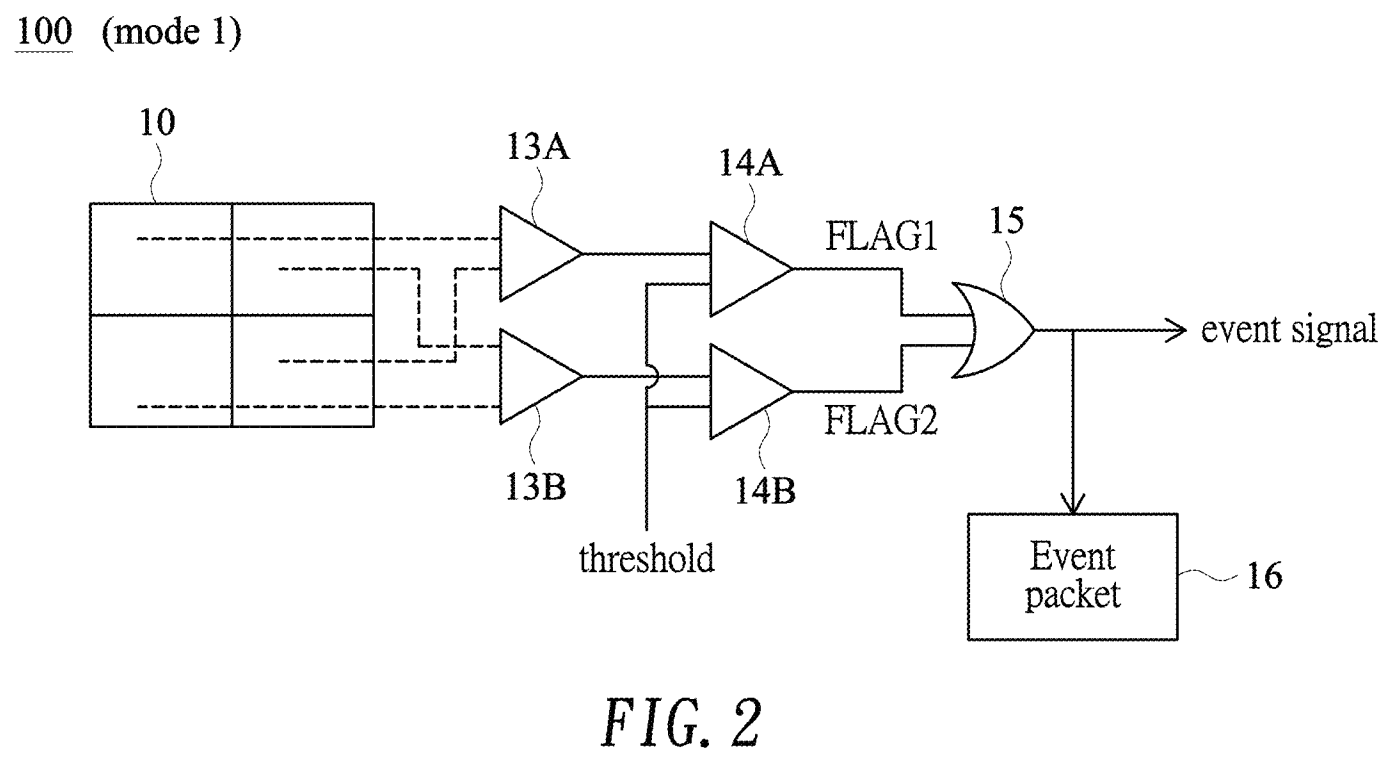

FIG. 2 shows a detailed block diagram of the DVS system 100 of FIG. 1 for mode 1 according to one specific embodiment of the present invention. The DVS system 100 of FIG. 2 may be adapted to, but not limited to, detecting spatial difference for edge detection.

Specifically, the DVS system 100 of the embodiment may include a first differential amplifier 13A coupled to receive a first pixel signal and a second pixel signal from (a specific region in) one frame read out of a pixel array 10, difference therebetween being amplified to generate a first difference signal. Specifically, a second pixel (e.g., as exemplified by the lower-right pixel) associated with the second pixel signal is located in a next column and a next row from a first pixel (e.g., as exemplified by the upper-left pixel) associated with the first pixel signal. Therefore, the first pixel and the second pixel are located diagonally opposite to each other.

The DVS system 100 of the embodiment may include a second differential amplifier 13B coupled to receive a third pixel signal and a fourth pixel signal from (the specific region in) the frame read out of the pixel array 10, difference therebetween being amplified to generate a second difference signal. Specifically, a third pixel (e.g., as exemplified by the upper-right pixel) associated with the third pixel signal is located in the next column and a same row from the first pixel, and a fourth pixel (e.g., as exemplified by the lower-left pixel) associated with the fourth pixel signal is located in a same column and the next row from the first pixel. Therefore, the third pixel and the fourth pixel are located diagonally opposite to each other.

In the embodiment, the DVS system 100 may include a first comparator 14A configured to compare the first difference signal (from the first differential amplifier 13A) with a (global) predetermined (first) threshold, thereby generating a first flag FLAG1, which is asserted (or active) when the first difference signal is greater than the predetermined (first) threshold. The DVS system 100 may include a second comparator 14B configured to compare the second difference signal (from the second differential amplifier 13B) with a predetermined (second) threshold, thereby generating a second flag FLAG2, which is asserted (or active) when the second difference signal is greater than the predetermined (second) threshold.

The DVS system 100 may include an event detection circuit 15 configured to generate an event signal according to the first flag FLAG1 and the second flag FLAG2. In the embodiment, the event detection circuit 15 may include an OR gate coupled to receive the first flag FLAG1 and the second flag FLAG2, and configured to generate the event signal, which is asserted (or active) when at least one of the first flag FLAG1 and the second flag FLAG2 is asserted. Events associated with corresponding event signals may be collected in or grouped into an event packet (or data packet) 16. The events as stored in the event packet 16 may contain the following information: timestamp recording precise time at which the event occurred, pixel coordinates (or pixel address) of the pixels where the event is detected, and polarity indicating whether change in light intensity is an increase or a decrease.

Figure 3:
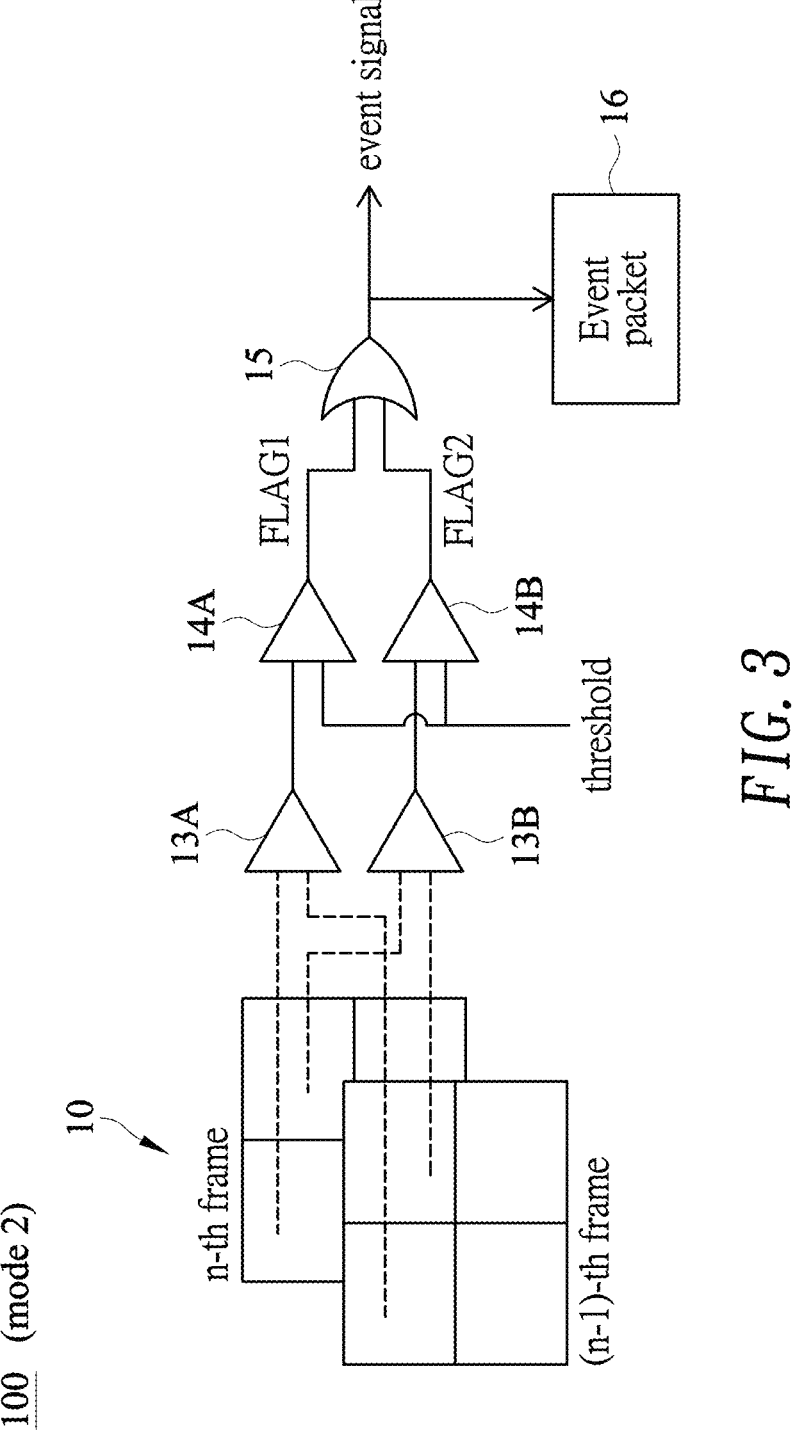
FIG. 3 shows a detailed block diagram of the DVS system of FIG. 1 for mode 2 according to another specific embodiment of the present invention.

FIG. 3 shows a detailed block diagram of the DVS system 100 of FIG. 1 for mode 2 according to another specific embodiment of the present invention. The DVS system 100 of FIG. 3 may be adapted to, but not limited to, detecting time difference for motion detection.

Specifically, the DVS system 100 of the embodiment may include a first differential amplifier 13A coupled to receive a first pixel signal and a second pixel signal from (a specific region in) a preceding (i.e., (n−1)-th) frame and a current (i.e., n-th) frame respectively read out of a pixel array 10, difference therebetween being amplified to generate a first difference signal. Specifically, a first pixel (e.g., as exemplified by the upper-left pixel) associated with the first pixel signal in the preceding frame and a second pixel (e.g., as exemplified by the upper-left pixel) associated with the second pixel signal in the current frame are located at a same pixel position.

The DVS system 100 of the embodiment may include a second differential amplifier 13B coupled to receive a third pixel signal and a fourth pixel signal from (the specific region in) the current (i.e., n-th) frame and the preceding (i.e., (n−1)-th) frame respectively read out of the pixel array 10, difference therebetween being amplified to generate a second difference signal. Specifically, a third pixel (e.g., as exemplified by the upper-right pixel) associated with the third pixel signal in the current frame and a fourth pixel (e.g., as exemplified by the upper-right pixel) associated with the fourth pixel signal in the preceding frame are located at a same pixel position, which is located in a next column and a same row from the first pixel and the second pixel.

In the embodiment, the DVS system 100 may include a first comparator 14A configured to compare the first difference signal (from the first differential amplifier 13A) with a (global) predetermined (first) threshold, thereby generating a first flag FLAG1, which is asserted (or active) when the first difference signal is greater than the predetermined (first) threshold. The DVS system 100 may include a second comparator 14B configured to compare the second difference signal (from the second differential amplifier 13B) with a predetermined (second) threshold, thereby generating a second flag FLAG2, which is asserted (or active) when the second difference signal is greater than the predetermined (second) threshold.

The DVS system 100 may include an event detection circuit 15 configured to generate an event signal according to the first flag FLAG1 and the second flag FLAG2. In the embodiment, the event detection circuit 15 may include an OR gate coupled to receive the first flag FLAG1 and the second flag FLAG2, and configured to generate the event signal, which is asserted (or active) when at least one of the first flag FLAG1 and the second flag FLAG2 is asserted. Events associated with corresponding event signals may be collected in or grouped into an event packet (or data packet) 16. The events as stored in the event packet 16 may contain the following information: timestamp recording precise time at which the event occurred, pixel coordinates (or pixel address) of the pixels where the event is detected, and polarity indicating whether change in light intensity is an increase or a decrease.

Although specific embodiments have been illustrated and described, it will be appreciated by those skilled in the art that various modifications may be made without departing from the scope of the present invention, which is intended to be limited solely by the appended claims.

What is claimed is:

1. A dynamic vision sensor (DVS) system, comprising:
a pixel array composed of a plurality of pixels;
a multi-channel differential amplifier composed of a plurality of differential amplifiers coupled to respectively receive plural pairs of pixel signals from one or more frames read out of the pixel array, thereby generating a plurality of difference signals respectively;
a multi-channel comparator composed of a plurality of comparators configured to respectively compare the difference signals with a predetermined threshold, thereby generating a plurality of flags respectively; and
an event detection circuit that generates an event signal according to the flags.

2. The system of claim 1, wherein the flags are asserted when corresponding difference signals are greater than the predetermined threshold.

3. The system of claim 1, wherein the predetermined threshold is a global threshold.

4. The system of claim 1, wherein the event detection circuit is configured such that the event signal is asserted when at least one of the flags is asserted.

5. The system of claim 1, further comprising an event packet generator coupled to the event detection circuit and configured to collect events associated with corresponding event signals into an event packet.

6. The system of claim 5, wherein the event packet generated by the event packet generator comprises pixel coordinates of pixels where an event is detected.

7. The system of claim 6, wherein the event packet further comprises timestamp recording precise time at which the event occurs, and polarity indicating whether change in light intensity is an increase or a decrease.

8. The system of claim 1, wherein the multi-channel differential amplifier comprises:
a first differential amplifier coupled to receive a first pixel signal and a second pixel signal from one frame read out of the pixel array, difference therebetween being amplified to generate a first difference signal, a second pixel associated with the second pixel signal being located in a next column and a next row from a first pixel associated with the first pixel signal; and
a second differential amplifier coupled to receive a third pixel signal and a fourth pixel signal from the frame read out of the pixel array, difference therebetween being amplified to generate a second difference signal, a third pixel associated with the third pixel signal being located in the next column and a same row from the first pixel, and a fourth pixel associated with the fourth pixel signal being located in a same column and the next row from the first pixel.

9. The system of claim 8, wherein the multi-channel comparator comprises:
a first comparator that compares the first difference signal with a predetermined first threshold, thereby generating a first flag, which is asserted when the first difference signal is greater than the predetermined first threshold; and
a second comparator that compares the second difference signal with a predetermined second threshold, thereby generating a second flag, which is asserted when the second difference signal is greater than the predetermined second threshold.

10. The system of claim 9, wherein the event detection circuit comprises an OR gate coupled to receive the first flag and the second flag.

11. The system of claim 1, wherein the multi-channel differential amplifier comprises:
a first differential amplifier coupled to receive a first pixel signal and a second pixel signal from a preceding frame and a current frame respectively read out of the pixel array, difference therebetween being amplified to generate a first difference signal, a first pixel associated with the first pixel signal in the preceding frame and a second pixel associated with the second pixel signal in the current frame are located at a same pixel position; and
a second differential amplifier coupled to receive a third pixel signal and a fourth pixel signal from the current frame and the preceding frame respectively read out of the pixel array, difference therebetween being amplified to generate a second difference signal, a third pixel associated with the third pixel signal in the current frame and a fourth pixel associated with the fourth pixel signal in the preceding frame being located at a same pixel position, which is located in a next column and a same row from the first pixel and the second pixel.

12. The system of claim 11, wherein the multi-channel comparator comprises:
a first comparator that compares the first difference signal with a predetermined first threshold, thereby generating a first flag, which is asserted when the first difference signal is greater than the predetermined first threshold; and
a second comparator that compares the second difference signal with a predetermined second threshold, thereby generating a second flag, which is asserted when the second difference signal is greater than the predetermined second threshold.

13. The system of claim 12, wherein the event detection circuit comprises an OR gate coupled to receive the first flag and the second flag.

* * * * *